US007103697B2

(12) United States Patent
Scordalakes (10) Patent No.: US 7,103,697 B2
(45) Date of Patent: Sep. 5, 2006

(54) FLOW-THROUGH REGISTER

(75) Inventor: Nicholas Emmanuel Scordalakes, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 302 days.

(21) Appl. No.: 10/338,629

(22) Filed: Jan. 8, 2003

(65) Prior Publication Data
US 2004/0133727 A1    Jul. 8, 2004

(51) Int. Cl.
G06F 13/00 (2006.01)
G06F 13/36 (2006.01)
G06F 13/14 (2006.01)

(52) U.S. Cl. .................. 710/302; 710/305; 710/306; 710/315

(58) Field of Classification Search ............. 710/305, 710/306, 315
See application file for complete search history.

(56) References Cited

U.S. PATENT DOCUMENTS

| | | | |
|---|---|---|---|
| 5,751,975 | A | 5/1998 | Gillespie et al. |
| 5,918,026 | A * | 6/1999 | Melo et al. ............... 710/314 |
| 6,047,345 | A * | 4/2000 | Kondo et al. ............. 710/110 |
| 6,067,595 | A * | 5/2000 | Lindenstruth ............. 710/307 |
| 6,209,051 | B1 | 3/2001 | Hill et al. |
| 6,237,048 | B1 | 5/2001 | Allen et al. |
| 6,457,091 | B1 | 9/2002 | Lange et al. |
| 6,574,695 | B1 * | 6/2003 | Mott et al. ................ 710/302 |
| 6,587,868 | B1 * | 7/2003 | Porterfield ................ 709/203 |
| 6,618,783 | B1 * | 9/2003 | Hammersley ............. 710/305 |
| 2003/0088717 | A1 * | 5/2003 | Bass ........................... 710/1 |

OTHER PUBLICATIONS

Intel, 21154 PCI to PCI Bridge Datasheet, Jul. 1999.*
Intel, Intel PCI Bridge Overview, Jan. 2001.*
VMICPCI-7755 datasheet, Jan. 2002, GE Fanuc Automation, Inc.*
"21145 PCI-to-PCI Bridge," *Intel Corporation,* Order No. 278108-002, Jul. 1999 (167 pages total).
"Tsi320 Dual-Mode PCI-toPCI Bus Bridge User Manual," *Tundra Semiconductor Corporation,* 80A600B_MA001_04, Jun. 2001 (pp. 1-392).

* cited by examiner

*Primary Examiner*—John R. Cottingham
*Assistant Examiner*—Christopher Daley
(74) *Attorney, Agent, or Firm*—Morrison & Foerster LLP (57) ABSTRACT

A selectively transparent interface circuit identified herein as a flow-through register (FTR) is disclosed. The FTR enables one or more devices on a primary bus to communicate with a device on a secondary bus without incurring the latency and performance degradation of conventional bridges. The FTR can also provide Hot Swap capability which allows, for example, a device designed for a regular PCI bus to be plugged into a CompactPCI bus while system power remains on. The synchronous flow-through nature of the FTR eliminates the need for large data buffers that would otherwise result in transaction delays and performance degradation. Unlike other types of non-transparent devices such as PCI-to-PCI bridges, the FTR does not occupy any configuration space and is fully transparent to the host and HBA device driver software during flow-through operation, eliminating the need for costly changes to host and device driver firmware/software.

39 Claims, 8 Drawing Sheets

FLOW-THROUGH REGISTER

BACKGROUND OF THE INVENTION

1. Field of the Invention

The present invention relates, generally, to a selectively transparent bus interface which enables one or more devices on a primary bus to communicate with a device on a secondary bus and, in one embodiment, to a primary bus to secondary bus selectively transparent interface with Hot Swap capability that does not incur the latency and performance degradation of conventional bridges.

2. Description of Related Art

The Peripheral Component Interconnect (PCI) bus is a common and integral part of modern computer systems. However, PCI bus systems are not physically well-suited for environments that require zero downtime for reconfiguration, or upgrades. The CompactPCI bus specification was developed to define a ruggedized version of the PCI bus for use in high reliability and availability systems. In a CompactPCI bus system, the bus is part of a powered backplane, and specialized circuit cards with staggered pins for the orderly application of power are coupled into the CompactPCI bus by insertion of the cards into slots on the backplane. One feature that the CompactPCI bus provides over a regular PCI bus is a Hot Swap feature, which is the ability to plug cards into and out of the backplane in a live (powered) environment, without having to turn off system power. Hot Swap is a term and definition governed by the CompactPCI specification, PICMG 2.1, R2.0, Jan. 17, 2001, incorporated herein by reference, which includes a definition of bits in a Hot Swap Register (HSR) used to perform Hot Swap operations.

Figure 1:
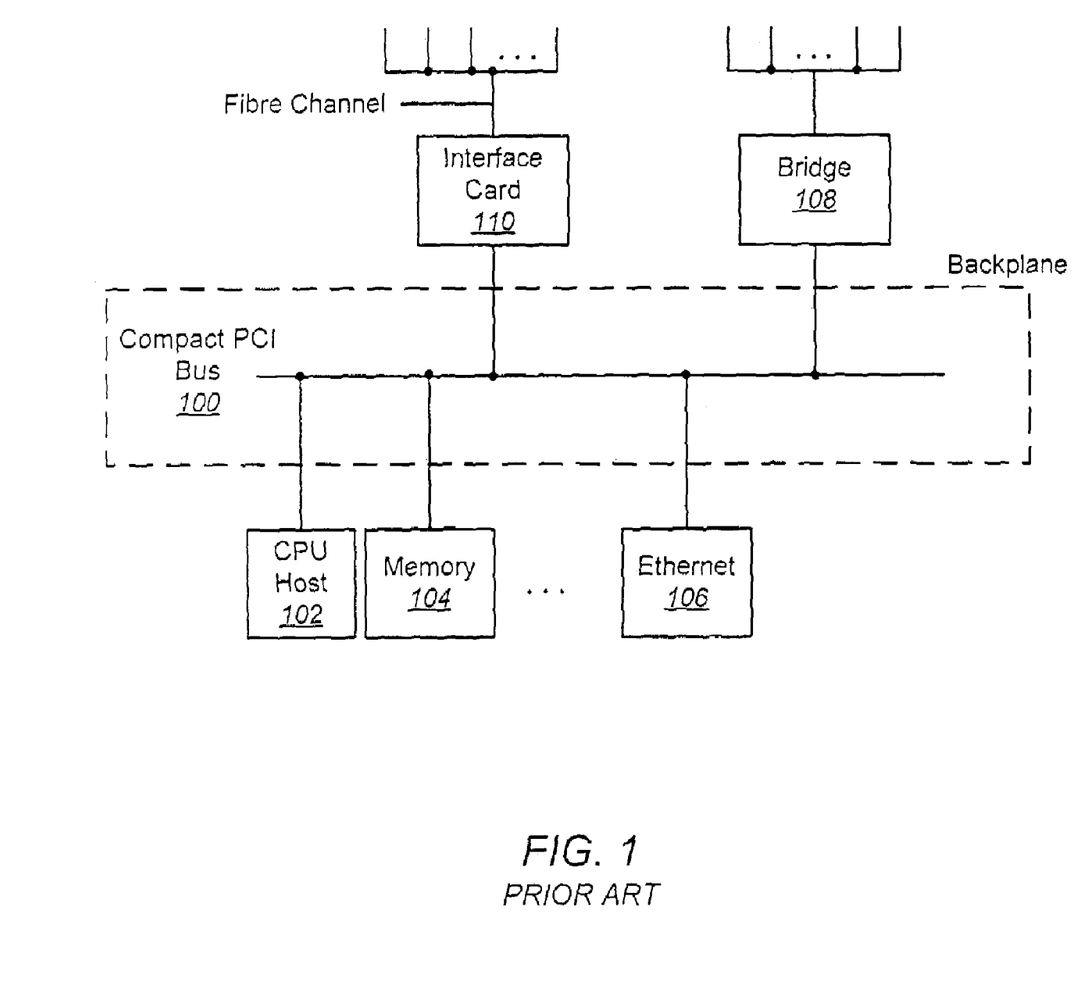
FIG. 1 is an exemplary block diagram illustrating a CompactPCI bus system.

As illustrated in the exemplary diagram of FIG. 1, as with a regular PCI bus, a CompactPCI bus 100 is typically part of a system which includes one or more processors or servers 102, main memory 104, Ethernet connections 106, bridges 108, adapter or interface cards 110, and the like. As with a regular PCI bus host, Standard Windows NT and Linux software can run on a CompactPCI bus host.

To implement Hot Swap capability, special circuitry is required in the hardware interface of the card, as well as system and card software drivers of cards that plug into the backplane. When a card is physically inserted or about to be extracted from a slot in the backplane, a latch on the card is closed or opened by an operator which triggers certain Hot Swap operations between the card and the host processor. These operations may load needed software drivers into host memory, or may delay the extraction of the card until all pending applications and transactions involving that card have been terminated.

Bridges are available on the market today which provide interface circuitry that performs the Hot Swap operations. However, these conventional bridges typically suffer from at least one or two performance drawbacks. First, some bridges with Hot Swap capability are non-transparent. Non-transparent bridges, as defined herein, occupy PCI configuration space and must be configured by the host before targets on the other side of the bridge can be accessed. In other words, the initiator must talk to the bridge before it can talk to the target device on the other side of the bridge. By comparison, transparent bridges occupy no configuration space, and thus only the target on the other side of the bridge needs to be addressed.

Second, conventional bridges suffer from poor data transfer rates. For example, conventional bridges with Hot Swap capability may produce a 30% performance degradation in the data transfer rates of PCI bus transactions. The performance degradation in conventional bridges is due in large part to the use of large first-in-first-out buffers (FIFOs) in data transfers. Conventional bridges utilize FIFOs to perform data transfers in two steps. For example, assume that an adapter card providing an interface to a fibre channel network is coupled to a secondary PCI bus. If the adapter card initiates a read data transaction from a target host processor on a primary PCI bus, an application specific integrated circuit (ASIC) resident on the adapter card may send the request to a bridge coupled to the secondary PCI bus, which will then forward the request to the host over the primary PCI bus. The bridge will then collect the data from the host in a FIFO within the bridge, and after some delay send the data back to the ASIC. This temporary accumulation of data in the FIFO is one source of delay. Another source of delay is the prefetching of expected data by the bridge. If the prefetched data turns out to be the wrong data, the data has to be discarded, creating additional delays.

Figure 2:
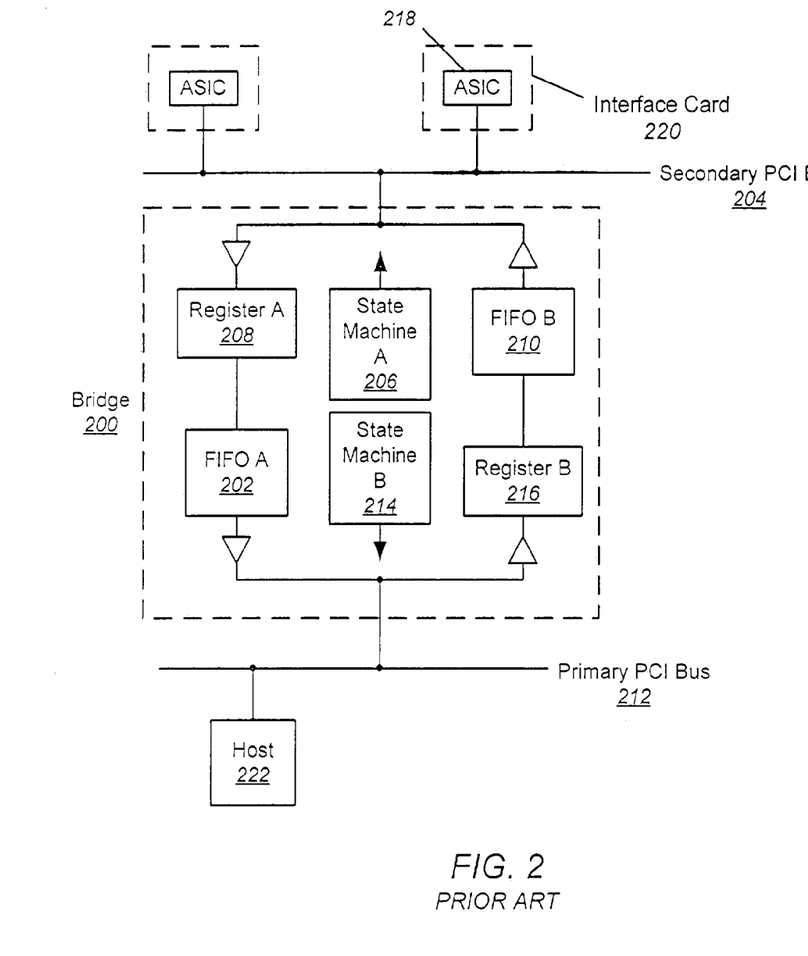
FIG. 2 is an exemplary block diagram illustrating the transfer of information between a primary PCI bus and a secondary PCI bus using a conventional bridge.

The data transfer process of conventional bridges is illustrated in further detail in the example block diagram of FIG. 2. In the example of FIG. 2, a conventional bridge 200 may include a FIFO A 202 for receiving data from a secondary PCI bus 204, a state machine A 206 for handling secondary PCI bus protocols, and a register A 208 for meeting timing in the transfer of information from the secondary PCI bus to the primary PCI bus. The bridge 200 may also include a FIFO B 210 for receiving data from a primary PCI bus 212, a state machine B 214 for handling primary PCI bus protocols, and a register B 216 for meeting timing in the transfer of information from the primary PCI bus to the secondary PCI bus. In the example of FIG. 2, state machine A 206 handles PCI bus handshaking with devices on the secondary PCI bus 204, while state machine B 214 handles PCI bus handshaking with devices on the primary PCI bus 212. If, for example, an ASIC 218 on an interface card 220 initiates a transaction to write a block of data from its memory to host 222, the ASIC 218 sends a write request to the bridge 200 via secondary PCI bus 204. State machine A 206 responds to the ASIC 218 with the appropriate PCI protocol handshaking. ASIC 218 then starts filling FIFO A 202 with data. While FIFO A 202 is being filled with data, state machine B 214 arbitrates for access to the primary PCI bus 212. Data in FIFO A 202 is transmitted to the host 222 over the primary PCI bus 212 only after access to the primary PCI bus 212 is granted to the bridge.

This conventional approach simplifies the state machines because they have reduced functionality. State machine A 206 only interfaces with devices on the secondary PCI bus 204 and can start transactions even though the bridge 200 does not yet have access to the primary PCI bus 212. State machine B 214, working somewhat independently from state machine A 206, only interfaces with devices on the primary PCI bus 212 and can arbitrate for access to the primary PCI bus 212, regardless of the status of transactions on the secondary PCI bus 204. This is known as a loosely coupled interface, with transfers taking an unknown number of PCI clock cycles. Because these state machines need only worry about accesses to one bus, they are relatively simple and easy to implement from standardized ASIC libraries. Although the independence of the buses and the relative simplicity of the state machines is facilitated by use of the FIFOs, the FIFOs and the two-step data transfer process create transfer delays of potentially many PCI clock cycles.

Figure 3:
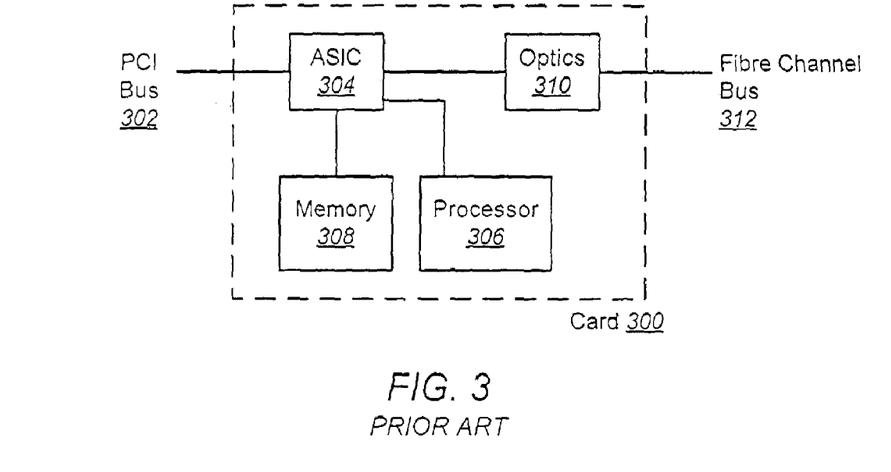
FIG. 3 is an exemplary block diagram illustrating a regular PCI bus to fibre channel network interface to be used in host bus adapter (HBA) designs for networking storage devices.

Because the PCI bus has gained extensive acceptance in the marketplace, there are a number of products on the market today that implement a PCI bus interface in adapters for other peripheral buses and channels, such as a fibre channel network interface to be used in host bus adapter (HBA) designs for networking storage devices. FIG. 3 illustrates such an adapter in which a PCI bus 302 connects directly to a card 300 having an adapter ASIC 304 with a PCI bus interface, the ASIC 300 being further connected to a processor 306, memory 308, and an optics block 310 for interfacing to a fibre channel bus 312. However, such adapters do not have Hot Swap capability for interfacing to the CompactPCI bus.

Thus, a need exists for a PCI bus to CompactPCI bus selectively transparent interface circuit that provides Hot Swap capability without the latency and performance degradation of conventional bridges.

SUMMARY OF THE INVENTION

Embodiments of the present invention are directed to a selectively transparent interface circuit, identified herein as a flow-through register (FTR), which enables one or more devices on a primary bus to communicate with a device on a secondary bus without incurring the latency and performance degradation of conventional bridges. The FTR may also provide Hot Swap capability which allows, for example, a device designed for a regular PCI bus to be connected to a CompactPCI bus while system power remains on.

The FTR enables existing devices which implement a regular PCI bus interface to be used in Host Bus Adapter (HBA) designs which interface to Hot Swap CompactPCI bus systems, and meets the electrical and functional requirements imposed by the Hot Swap CompactPCI Specification. The synchronous flow-through nature of the FTR eliminates the need for large data buffers that would otherwise result in transaction delays and performance degradation. Unlike other types of non-transparent devices such as PCI-to-PCI bridges, the FTR does not occupy any configuration space and is fully transparent to the host and HBA device driver software during flow-through operation, eliminating the need for costly changes to host and device driver firmware/software. The additional functionality defined in the Hot Swap CompactPCI Specification is implemented in the FTR. Accesses to the CompactPCI Hot Swap Register (HSR) by the host software are intercepted by the FTR, which then responds to the requested transaction.

Transactions, which include the transmission of addresses, data and certain control signals in both directions are registered (pipelined) through the FTR using the host CompactPCI clock. Transactions, with the exception of accesses to the HSR, flow uninterrupted from the initiator to the target where they are interpreted and executed. The delay of one PCI clock period in each direction of the transaction, caused by the clocking of data and certain control signals through a register in the FTR, results in insignificant performance degradation because typical PCI bus transactions involve large bursts of data.

The FTR also maintains a shadow copy of the target device Base Address Registers (BAR). When a transaction is initiated by the host, these shadow BARs are used to decode the target address and respond back to the host with DEVSEL# in order to meet PCI bus timing requirements. FRAME# and IRDY# from the host are regenerated in the FTR and forwarded to the target, and TRDY# from the target is regenerated in the FTR and forwarded to the host to transparently complete the start of the transaction.

The FTR also maintains a page boundary address crossing detect circuit to prevent unintended accesses across page boundaries which might result in page faults and system crashes. This possibility arises because certain control signals are also delayed by one PCI clock period as they are regenerated by the FTR. For example, although the end of a read transaction may be indicated by the initiator device with a deassertion of FRAME#, the delay in regenerating the deasserted FRAME# in the FTR and forwarding it to the target device may cause the target device to fetch one too many words, thus crossing a page boundary. In order to prevent this from happening, the FTR maintains a counter which is initialized with the starting address of each read transaction initiated by the ASIC and is incremented at each tick of a burst data transfer. Circuitry in the FTR monitors the output of the counter, and when the output reaches a 4K (binary) boundary, the FTR deasserts IRDY# on the primary PCI bus and TRDY# on the secondary PCI bus, halting pre-fetching momentarily in order to determine if the initiator device will signal the end of the transfer by deasserting FRAME#. If FRAME# is not deasserted, the transaction resumes.

DETAILED DESCRIPTION OF PREFERRED EMBODIMENTS

In the following description of preferred embodiments, reference is made to the accompanying drawings, which form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention provide a selectively transparent interface circuit, identified herein as a flow-through register (FTR), which enables one or more devices on a primary bus to communicate with a device on a secondary bus without incurring the latency and performance degradation of conventional bridges. Further embodiments of the present invention also provide Hot Swap capability which allows, for example, a device designed for a regular PCI bus to be plugged into a CompactPCI bus while system power remains on.

Although embodiments of the present invention are primarily described herein in terms of a regular (primary) PCI bus to CompactPCI (secondary PCI) bus selectively transparent interface circuit for purposes of illustration and discussion only, it should be understood that the invention is not limited to interfacing between a PCI bus and a CompactPCI bus, but includes interfacing between other types of buses that may include, but are not limited to, VERSAmodule European (VME) buses or SBuses (a bus developed by Sun Microsystems). Both the VME bus and SBus have become IEEE standards and are widely known as VME and Sbus. In addition, the invention is not limited to Hot Swap protocols according to the CompactPCI specification, but may be adapted to operate with other systems that allow powered insertion and extraction of circuit cards. In general, the selectively transparent interface circuit of embodiments of the present invention provides an interface between a primary bus implementing a primary bus protocol and a secondary bus implementing a secondary bus protocol, wherein the secondary bus protocol is a subset of the primary bus protocol. Thus, for example, if a modified VME bus known as the "PoweredSwapVME bus" (the primary bus) and implementing a modified VME bus specification (the primary bus protocol) with an architecture for powered insertion or extraction of circuit cards was developed as a high-reliability alternative to the existing VME bus (the "secondary bus") and the existing VME bus protocol (the "secondary bus protocol"), embodiments of the present invention could provide a VME bus (the "secondary bus") to PoweredSwapVME bus (the "primary bus") interface.

Note that for purposes of distinguishing herein transactions between devices on the primary and secondary buses, transactions initiated from a device on the primary bus and targeted to the device on the secondary bus may be referred to as forward transactions, and transactions initiated from the device on the secondary bus and targeted to a device on the primary bus may be referred to as reverse transactions.

Figure 4:
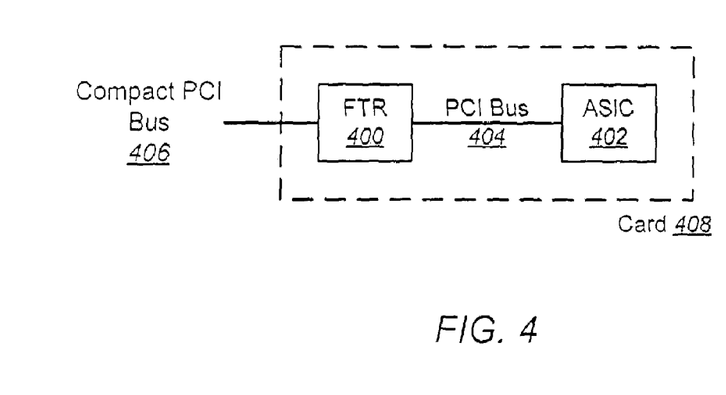
FIG. 4 is an exemplary block diagram illustrating a flow through register (FTR) for providing an interface between a primary PCI bus and a secondary PCI bus according to embodiments of the present invention.

FIG. 4 is an exemplary block diagram illustrating a flow through register (FTR) 400 according to embodiments of the present invention. In FIG. 4, the FTR 400 is a selectively transparent interface circuit that enables an adapter ASIC 402 compatible with a regular PCI bus 404 to be connected to and communicate with a CompactPCI bus 406. Although not shown in FIG. 4, in one particular embodiment, the FTR may be part of an HBA, and the adapter ASIC may be a fibre channel controller circuit. The HBA may itself be part of a server computer, with a host CPU coupled to the CompactPCI bus. A storage area network (SAN) may include the server computer, and the fibre channel controller circuit may be coupled to storage devices through a fibre channel network. In the example of FIG. 4, the ASIC 402 is resident on a CompactPCI compatible card 408. Because the FTR 400 provides Hot Swap capability, the card 408 may be inserted into or extracted from a CompactPCI bus backplane while the system is powered. The FTR 400 of FIG. 4 may be realized in discrete logic, a field-programmable gate array (FPGA), an application specific integrated circuit (ASIC), or other forms available to those skilled in the art.

Figure 5:
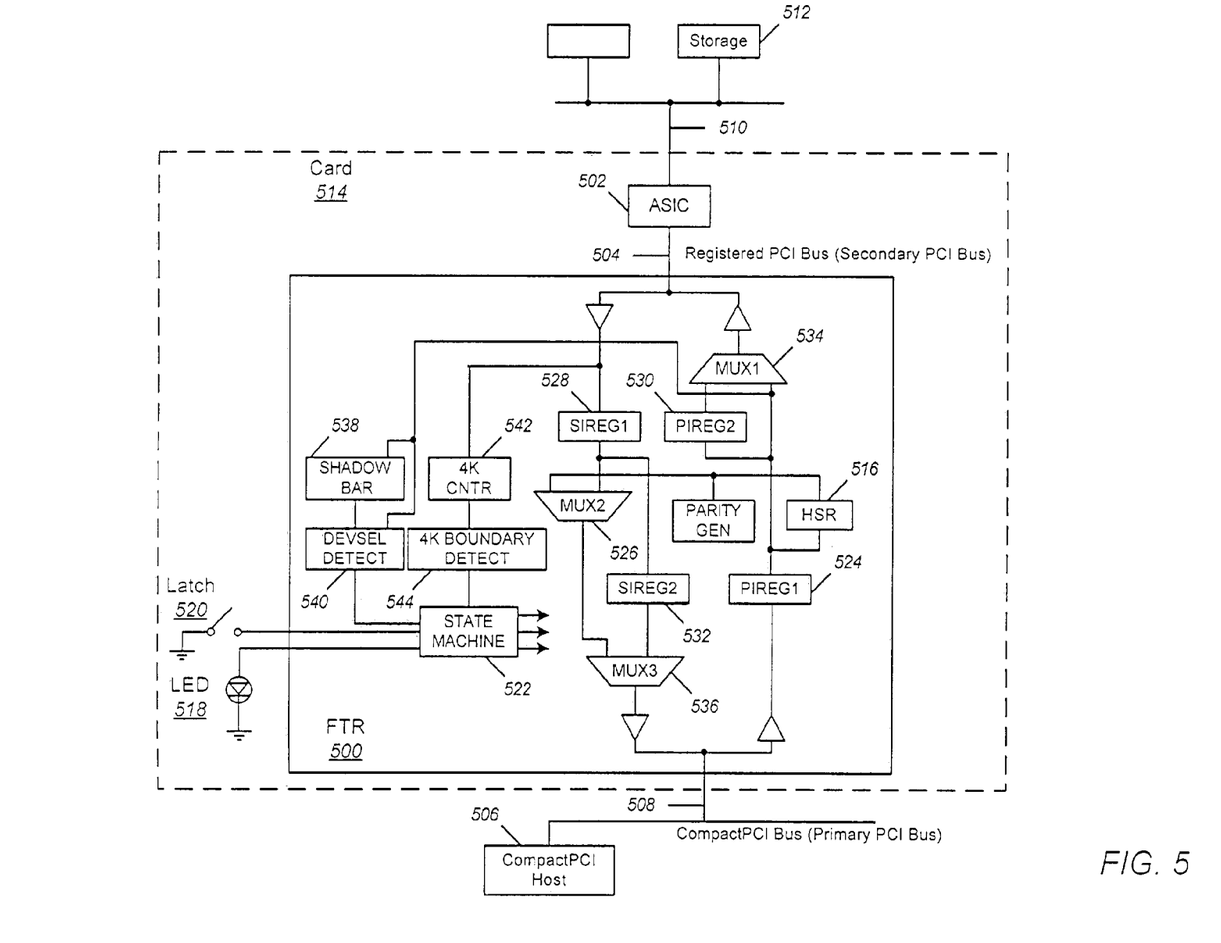
FIG. 5 is a more detailed exemplary block diagram illustrating an FTR for providing an interface between a primary PCI bus and a secondary PCI bus according to embodiments of the present invention.

FIG. 5 is a more detailed exemplary block diagram of an FTR according to one embodiment of the present invention. In FIG. 5, the FTR 500 is a selectively transparent interface circuit that enables an ASIC 502 compatible with a regular PCI bus 504 to be connected to devices such as a host central processing unit (CPU) card 506 on a CompactPCI bus 508. In the specific example of FIG. 5, the ASIC 502 is an adapter or interface circuit for connecting a serial fibre channel network 510 to multiple networked storage devices 512, and the ASIC 502 and the FTR 500 reside on a card 514 that plugs into the CompactPCI bus backplane. The CompactPCI bus side of the FTR 500 may also be referred to herein as the primary PCI bus, while the regular PCI bus side of the FTR 500 may also be referred to herein as the secondary PCI bus (bridge terminology) or registered PCI bus.

The FTR 500 includes logic for providing Hot Swap functionality and logic for providing flow-through functionality. Transactions for the transfer of information between the primary PCI bus and the secondary PCI bus having nothing to do with Hot Swap functionality are passed through the FTR 500 in a flow-though, transparent fashion. However, when a card 514 is inserted into a CompactPCI bus slot or about to be extracted from the CompactPCI bus slot, certain Hot Swap operations are initiated by both the FTR 500 and the host 506. One of these operations requires that the host 506 read the Hot Swap register in the FTR 500. When the host 506 issues a command to access the Hot Swap register, this command is intercepted, and further Hot Swap operations are performed to provide Hot Swap functionality.

Integral to Hot Swap functionality is Hot Swap register (HSR) 516 in FTR 500. In the example of FIG. 5 and the description that follows, HSR 516 is a register defined by the CompactPCI specification. However, it should be understood that in other embodiments of the present invention, HSR 516 may be configured to be compatible with the handshaking protocols of other systems which enable cards to be inserted or extracted while system power remains on.

The CompactPCI card 514 includes an Ejector Latch/Switch and a blue light emitting diode (LED) 518. When card 514 is pushed into the slot by an operator, the card 514 receives power and the ASIC 502 is initialized to an idle state. The blue LED is illuminated, indicating that the card is powered but latch 520 is not closed. At this time, host 506 is not aware that card 514 has been installed. Next, the operator manually closes the latch 520, and a state machine 522 in FTR 500 senses the closure of the latch 520 and asserts a bit in the HSR to turn the blue LED off and asserts a second bit to indicate that an insertion has been performed. The blue LED 518 being off is an indication that the card may no longer be physically pulled out of the slot without following the extraction procedure described below. The insertion bit drives an ENUM signal on the primary PCI bus 508, which is a bus signal shared by cards on the primary PCI bus 508, telling the host 506 that a card was either inserted or extracted. The host 506 polls cards on the primary PCI bus 508 by placing a configuration read command to the address associated with the HSR of each card on the bus. Each HSR address is clocked into primary input register 1 (PIREG1) 524. State machine 522 reads the address information from PIREG1 524, determines that this is a local address for the HSR 516 (described in greater detail below), determines from the C/BE bus signal that the command is a configuration read, and sends the HSR content back to the host 506 through MUX2 526. Note that the logic paths and logic elements in FTR 500 may be implemented in a number of functionally similar but insubstantially different ways by those skilled in the art. The host 506 examines the insertion and extraction bits from the received HSR content and, for cards that were not inserted or extracted, determines that neither the insertion or extraction bits are asserted. Eventually, the HSR 516 in the inserted card is addressed. The host 506 examines the insertion bit and determines that the card was inserted. The host 506 then sends a write command to the HSR 516 to deassert the insertion bit. The host then may read firmware stored on the card or load into host memory software such as Windows or UNIX drivers stored in the local disk to enable the host to communicate with the card.

Prior to an extraction, the operator opens the latch 520, but leaves the card in. State machine 522 in FTR 500 senses the opening of the latch 520 and asserts an extraction bit in the HSR 516. The extraction bit drives an ENUM signal on the primary PCI bus 508, telling the host 506 that a card was either inserted or extracted. The host 506 polls cards on the primary PCI bus 508 by placing a configuration read command to the address associated with the HSR of each card on the bus. State machine 522 reads the address information from PIREG1 524, determines that this is a local address for the HSR 516, determines from the C/BE bus signal that the command is a read, and sends the HSR content back to the host 506 through MUX2 526. The host 506 examines the insertion and extraction bits from the received HSR content and, for cards that were not inserted or extracted, determines that neither the insertion or extraction bits are asserted. Eventually, the HSR 516 in the card to be extracted is addressed. The host 506 examines the extraction bit and determines that the card is to be extracted. The host 506 makes sure that there are no applications running in the card by communicating with the software driver for the card. If there are applications running, the software driver may terminate them or wait for them to complete. The driver then reports to the host that all applications have been terminated. Once it is determined that no applications are running in the card, the host sends a write command to the HSR 516 to turn the blue LED on and deassert the extraction bit in the HSR. The blue LED being on is an indication that the card may now be physically pulled out of the slot.

Figure 6:
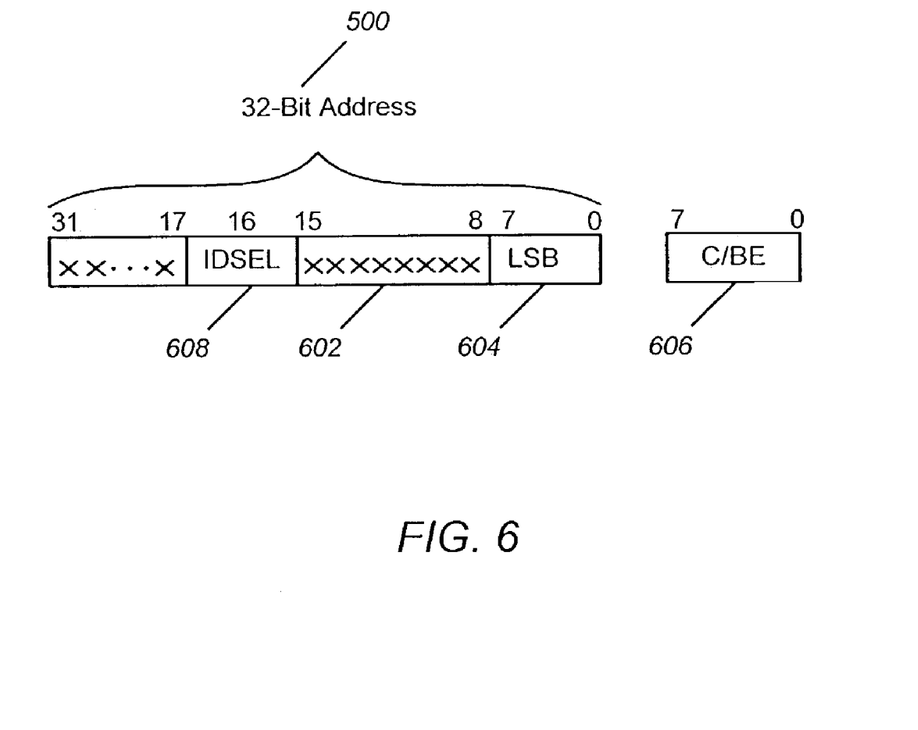
FIG. 6 is an exemplary representation of the addressing and control of the Hot Swap register (HSR) according to embodiments of the present invention.

Referring additionally to FIG. 6, a transaction intended for the HSR 516 will now be described in greater detail. When host 506 places a 32-bit address 500 on the primary PCI bus 508, it is clocked into PIREG1 524. An 8 bit C/BE command field 606 is also driven on the primary PCI bus 508 and clocked into PIREG1 524 to indicate the type of access (cycle). There are three types of cycles, memory cycles, configuration cycles, and I/O cycles. Memory cycles can be used to access memory mapped registers or actual memory.

One of the address lines A[16:31] of the 32-bit Address 500 is hardwired on the backplane to an initialization device select (IDSEL) input of each card. If the C/BE field indicates that the current transaction is a configuration cycle, each card examines its IDSEL line to determine if it is addressed. The addressed card decodes the 8 LSBs 604 of the address to determine which configuration register is being accessed. If the addressed register is the HSR 516 and the operation is a write cycle, data is transferred from PIREG1 524 to the HSR516; if the operation is a read cycle, the contents of the HSR are routed through MUX2 526 and MUX3 536 to the CompactPCI bus 508 under control of state machine 522.

It should be understood that although the previous discussion focused on the powered insertion or extraction of cards, in alternative embodiments of the present invention other special operations and transactions are supported. As noted above, the selectively transparent interface circuit of embodiments of the present invention provides an interface between a primary bus implementing a primary bus protocol and a secundary bus implementing a secondary bus protocol, wherein the secondary bus protocol is a subset of the primary bus protocol. The operations/transactions unique to the primary bus protocol are those that, like the Hot Swap operation discussed above, can be detected and intercepted by the FTR. Once intercepted, these special transactions do not flow through the FTR transparently, but instead may be processed within the FTR. Thus, the FTR is only selectively transparent. Once these special transactions are intercepted, addressable registers similar to the HSR discussed herein, as well as other sequential and combinational logic in the state machine or in addition to the state machine, may be implemented to perform the operations of these special transactions.

Referring again to the Hot Swap example of FIG. 5, after card 514 is inserted and the Hot Swap operations are completed, the FTR 500 operates in a flow-through mode and is transparent to information transfers between the primary PCI bus 508 and the secondary PCI bus 504, other than a delay of one PCI clock period. "Transparent," as defined herein, means that the software drivers in the initiator and target devices do not address the FTR 500, and operate as though the FTR 500 was not part of the transfer path. Note that with conventional non-transparent bridges, the software drivers in the initiator and target devices must understand that the bridge exists in the transfer path (i.e. that the bridge occupies configuration space), and must configure the bridge before attempting to address a device on the other side of the bridge. Once configured, a non-transparent bridge intercepts and queues commands from either bus, responds on behalf of the targeted device, then forwards the command to the targeted device and queues and forwards the response to the initiator. In other words, an initiator device must talk to the bridge before it can talk to the target device. By comparison, in a transparent bridge, the device on the other side of the bridge is directly addressed.

The one PCI clock period delay through the FTR 500 exists because information transfers from the primary PCI bus to the secondary PCI bus must be clocked into PIREG1 524, and information transfers from the secondary PCI bus to the primary PCI bus must be clocked into SIREG1 528 before passing out of the FTR 500. Registers PIREG1 524 and SIREG1 528 are necessary to latch information so that it can be read and possibly acted upon by the FTR 500. The one PCI clock period delay in the present invention represents a significant reduction in the latency of conventional bridges, which capture a large amount of information from the initiator device in FIFOs before transmitting the information to the target device. With embodiments of the present invention, the primary PCI bus and the secondary PCI bus are more tightly coupled, without large temporary storage areas.

However, the one PCI clock period delay for information transfers can create timing problems in certain situations that must be compensated for by the FTR 500. First, the processing delays through the FTR 500 cause target device handshaking to violate the protocols of the PCI specification, so the FTR must act as a surrogate for the target device and generate its own handshaking signals back to the initiator device. Second, the processing delays through the FTR 500 cause target device "wait" control signals to be received by the initiator device so late as to result in dropped data, so the FTR must provide a means of preserving a certain amount of data in case a target device "wait" control signal is received. Third, the processing delays through the FTR 500 cause target device "end of frame" control signals to be received by the initiator device so late as to result in an extra word of data being transferred out beyond permissible page boundaries, so the FTR must provide for the early detection of page boundaries. These three situations will be discussed in greater detail below.

The generation of PCI-compliant handshaking protocols will be discussed first. Aside from Hot Swap capability, CompactPCI bus protocols are identical to regular PCI bus protocols. For example, when an address is placed on the CompactPCI bus, according to PCI bus protocols the target device must respond with a device select signal (DEVSEL#) within three PCI clock cycles. If an assertion of DEVSEL# is not timely, the initiator device assumes that the addressed target device does not exist, and that address will never be used again. However, because transactions through the FTR take one PCI clock period in either direction, the assertion of DEVSEL# may not be received by the initiator device in a timely fashion. In the example of FIG. 5, if an address was propagated to ASIC 502 and host 506 waited until the assertion of DEVSEL# generated by ASIC 502 was received, the three PCI clock period requirement could not be met.

Thus, embodiments of the present invention provide for early recognition by the FTR of a transaction as being intended for the target device, and provide a way for the FTR to quickly respond with PCI handshaking signals without having to wait for a response by the target device. In regular PCI bus or CompactPCI bus transactions, the address placed on the address/data bus by a host initiator device may define a base address register (BAR) in the target device for indirect memory addressing (IMA). IMA gives flexibility to the host device to map a target device's memory anywhere within the host's address space, a flexible way of assigning and utilizing available address space. For example, in a 32-bit address the most significant bits may define a particular BAR, and the least significant bits may define a location in the memory corresponding to that BAR, which is the real intended target memory location. Thus, the use of BARs requires a two-level address translation.

In the example of FIG. 5, a fixed number of BARs are maintained in ASIC 502. There are a corresponding number of shadow BARs 538 in the FTR 500. Each BAR in ASIC 502 is associated with a unique memory space. When the host processor 506 first writes to the BARs in ASIC 502 to initialize them (assign the addresses of the BARs), these BAR write commands are detected by the FTR 500 in PIREG1 524, and a copy of the BAR contents is stored in the shadow BARs 538. Thereafter, when an initiator device on the primary PCI bus places an address into PIREG1 524, the FTR 500 compares the most significant bits of the address to the contents of the shadow BARs 538 in the DEVSEL detect block 540. When a match is detected (a hit), the state machine 522 in the FTR 500 immediately responds to the initiator device by asserting the DEVSEL# control signal instead of waiting for the ASIC 502 to generate DEVSEL#. By having the FTR 500 respond with DEVSEL# instead of the ASIC 502, PCI specification handshaking requirements can be satisfied.

With regard to situations where the ASIC 502 on the secondary PCI bus 504 is the initiator of a transaction, it should be understood that ASIC-initiated transactions are controlled by the host 506 on the primary PCI bus. Therefore, any ASIC-initiated transaction uses direct addressing for accessing devices on the primary PCI bus, and there is no need for address translation through the BARs. Thus, when the state machine 522 recognizes that an address has been placed in SIREG1 528, the FTR 500 immediately responds to the ASIC 502 by asserting the DEVSEL# control signal on the secondary PCI bus instead of waiting for the target device on the primary PCI bus to generate DEVSEL#.

The state machine 522 also handles other protocols and handshaking for the primary and secondary PCI buses 508 and 504, respectively. For example, the PCI protocol handshaking signals IRDY# and TRDY# may all be generated by the state machine 522 with a certain timing dictated by the PCI specification. In the example of FIG. 5 wherein the host 506 is the initiator and the ASIC 502 is the target, the state machine 522 generates the PCI handshaking signals in place of the ASIC 502 to avoid the delays that would result if the ASIC 502 generated the PCI handshaking signals. This is also true when the ASIC 502 is the initiator and the host 506 is the target. The state machine 522 may be implemented in a number of ways by those skilled in the art, the only requirement being that the handshaking signals generated by the state machine 522 must conform to the PCI specification. For example, alternative embodiments could be constructed using combinatorial logic or programmed logic rather than state machines. Note again that in other embodiments of the present invention, state machine 522 may conform to other non-PCI bus protocols.

The proper handling of target device "wait" control signals will be discussed next. As described above, in a typical information transfer from an initiator on the primary PCI bus to a target on the secondary PCI bus, information will first be clocked into parallel register PIREG1, and on the next PCI clock edge clocked out to the secondary PCI bus, resulting in a delay of one PCI clock cycle. Information is transferred at a rate of 32/64 bits per PCI clock period, because the primary and secondary PCI buses are 32/64 bits wide. However, during an information transfer, the target device may deassert TRDY#, which tells the initiator device to wait or pause momentarily because the target's buffer is full, for example. When the FTR receives the deasserted TRDY#, it propagates the deasserted TRDY# to the initiator device. The propagation of the deasserted TRDY# takes one PCI clock period. The initiator device will not stop transmitting until it receives the deasserted TRDY#, so because of the one PCI clock period delay, by the time the initiator device stops transmitting, one extra 32/64-bit data word will have been transmitted and lost.

Referring again to FIG. 5, because of this timing problem, embodiments of the present invention include primary input register 2 (PIREG2) 530 to reclock the information stored in PIREG1 524. If a deasserted TRDY# is received from a target device on the secondary PCI bus 504 (to pause the transaction) and the deasserted TRDY# is decoded by FTR 500 in state machine 522, multiplexer 1 (MUX1) 534 is switched by the state machine 522 to pass information from PIREG2 530 rather than PIREG1 524. When TRDY# is once again asserted by the target device on the secondary PCI bus 504 and decoded by FTR 500 in state machine 522 (a resumption of the transaction), the information is taken from reclocked PIREG2 530 instead of PIREG1 524. By doing so, the extra 32/64-bit data word that would otherwise have been transmitted and lost can be retransmitted. Note that PIREG2 530 is always reclocking the data from PIREG1 524, but PIREG2 534 is never used unless a deasserted TRDY# is received. Once the initiator stops transmitting information into PIREG1 524, the information in that register "catches up" with the information in PIREG2 530, and MUX1 534 can be switched back to receive information from PIREG1 524.

In an information transfer from an initiator on the secondary PCI bus to a target on the primary PCI bus, when a deasserted TRDY# is received by the FTR from a target device, a similar procedure is followed. SIREG2 532 is used to reclock the information stored in SIREG1 528, multiplexer 3 (MUX3) 536 is switched to pass information from SIREG2 532 rather than SIREG1 528, and when TRDY# is once again asserted by the target device on the primary PCI bus 508 and decoded by FTR 500 in state machine 522, the information is taken from reclocked SIREG2 532 instead of SIREG1 528.

Figure 7:
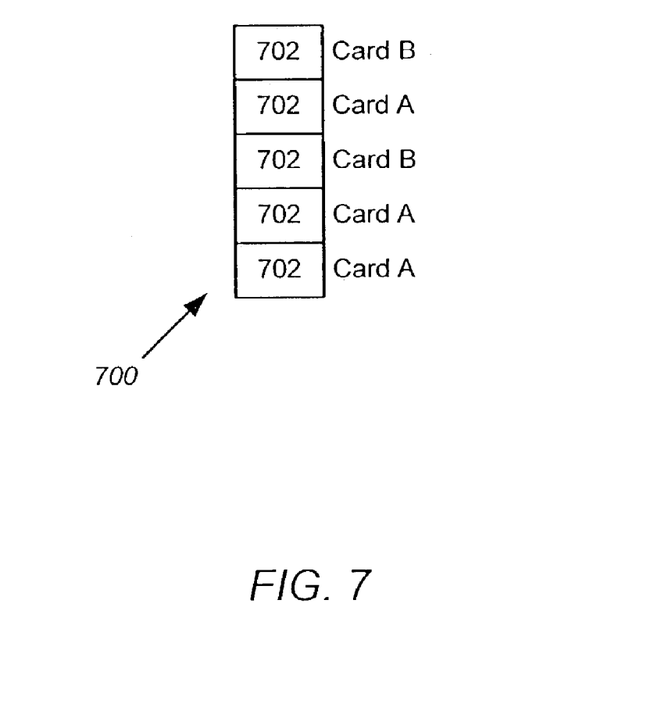
FIG. 7 is an exemplary memory space diagram to illustrate page boundary detection according to embodiments of the present invention.

The proper handling of target device "end of page" control signals will now be discussed. Referring now to the example memory space diagram of FIG. 7, modem operating systems (OSs) divide memory space 700 into pages 702, and allocate pages of memory to specific devices. In the example of FIG. 7, pages are allocated between card A and card B such that the memory space for a card is not necessarily consecutive. Protection mechanisms exist such that if card A attempts to access a page of memory allocated to card B, for example, a system fault is generated.

Referring again to the example of FIG. 5, suppose ASIC 502 initiates a burst read transfer of a certain number of consecutive pages of data from host memory. A read transaction is initiated, and after the proper handshaking is confirmed, the selected pages of data begin to be transferred from host memory to the ASIC 502 through the FTR 500. When the ASIC 502 determines that the end of the last page in the burst transfer is reached, the ASIC 502 deasserts FRAME#, which tells the host 506 to stop transmitting data. However, because of the one PCI clock period delay in regenerating the deasserted FRAME# in FTR 500, host 506 does not receive the deasserted FRAME# until one PCI clock period later, which is after the next word has been fetched from host memory. As a result, an extra word will have been fetched. If this next word is from a page that was not allocated to ASIC 502, a fault will be generated.

To prevent this from happening, in embodiments of the present invention a boundary detect counter 542 is employed which is loaded with the starting address of each ASIC initiated read transaction and is incremented at each tick of a burst transfer. Because a page size is typically sized in multiples of 4 kbytes, in a preferred embodiment of the present invention the boundary detect counter 542 is configured to have a terminal count of binary 4 k. Note that by selecting a terminal count of binary 4 k, the counter will detect page boundaries for all page sizes that are integer multiples of binary 4 k. When the boundary detect counter reaches a value one less than its terminal count, the state machine 522 tells the host 506 to pause the transaction (i.e., stop pre-fetching) using the handshaking signals, and wait to see if the ASIC 502 indicates that this is the end of the burst transfer, because the boundary detect 544 can only identify potential page boundaries, not burst transfer boundaries. If the ASIC 502 indicates that the end of the burst transfer is reached, then no fault is generated because by the time the stop transmission command is received by the host 506 from the ASIC 502 through the FTR 500, only the last word in the page will have been transmitted, and no word from a page allocated to another device will have been transmitted. Handshaking signals are then used to terminate the transaction. If the end of the burst transfer is not reached, then the FTR 500 tells the host 506 via handshaking signals to resume the data transmission. It should be noted that in alternative embodiments of the present invention the boundary detect counter 542 could be programmable.

Figure 8:
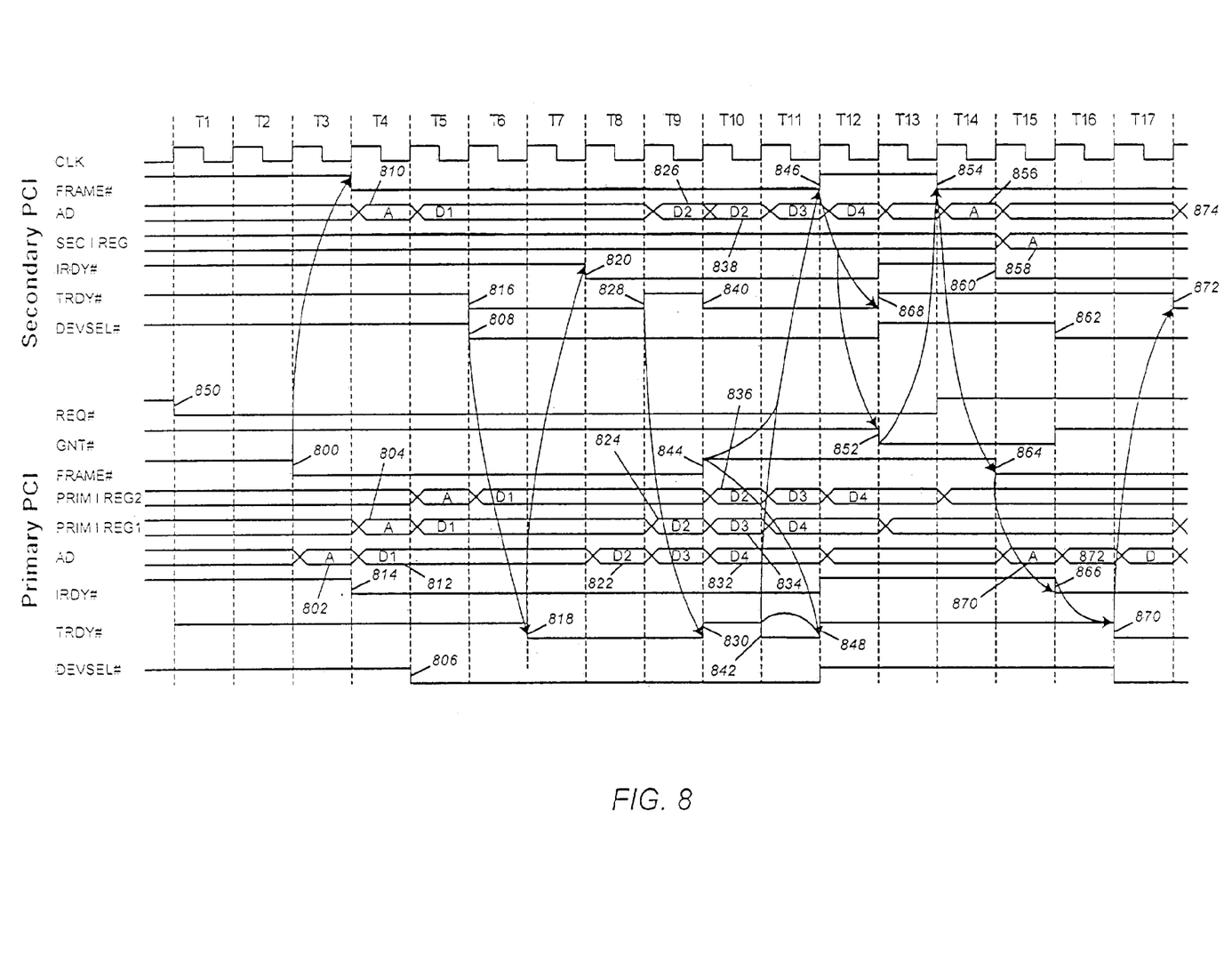
FIG. 8 is an exemplary timing diagram of a host-initiated write transaction with a target wait followed by a target-initiated read according to embodiments of the present invention.

FIG. 8 illustrates a timing diagram of a host-initiated write transaction with a target wait followed by a target-initiated read in the example system of FIG. 5 according to an embodiment of the present invention. During host write transactions, the FTR uses IRDY# on the secondary bus to synchronize data flow between the initiator and the target. The FTR regenerates TRDY# to the initiator while holding IRDY# to the target deasserted until data begins to flow through the pipeline. For example, in FIG. 8, on the secondary bus IRDY# is deasserted during time periods T5–T7. A more detailed explanation of FIG. 8 follows.

First, although not shown in the example of FIG. 8, a host on a primary PCI bus attempted to initiate a write transaction to the ASIC by requesting access to the primary PCI bus by asserting a dedicated request line (REQ#) to a PCI bus arbiter. Subsequent to the request, the PCI bus arbiter granted the primary PCI bus to the host by asserting a dedicated GNT# line to the host. FRAME# at 800 is asserted and driven onto the primary PCI bus by the host, indicating the start of the host write transaction. An address 802 is then placed on the primary PCI bus by the host at time T3, and the C/BE lines (not shown) are also driven on the primary PCI bus by the host. On the next PCI clock, the address is clocked into PIREG1 804 in the FTR. This address is decoded in the FTR, and the FTR asserts DEVSEL# at 806 on the primary PCI bus to tell the host that the FTR recognizes the address as targeted for the ASIC. Note that DEVSEL# at 806 is driven by the FTR, not the ASIC, because if the DEVSEL# from the ASIC was used at 808, it would not meet the three clock cycle response requirement of the PCI specification. At 810, the address appears on the secondary PCI bus one PCI clock cycle after it was placed on the primary PCI bus.

After the address has been placed on the primary PCI bus by the host, the host drives the first data word D1 on the primary PCI bus at 812 along with an asserted IRDY# at 814. The host cannot place another data word on the primary PCI bus until it sees an asserted TRDY# from the target (the ASIC), indicating that the ASIC is ready to receive data. It takes a total of three clock cycles for the asserted IRDY# at 814 to be regenerated by the FTR and forwarded to the secondary PCI bus, for the ASIC to place an asserted TRDY# and DEVSEL# on the secondary PCI bus at 816 and 808, and for the FTR to regenerate an asserted TRDY# and place it on the primary PCI bus and make it available to the host at 818.

Once an asserted TRDY# appears on the primary PCI bus at 818, the FTR asserts IRDY# on the secondary PCI bus one PCI clock cycle later at 820, indicating that the host is ready and that data is available on the secondary PCI bus. (The state machine 522 generates IRDY# on the secondary PCI bus to indicate to the target that it has write data available on the bus.) At this point in time, the next data word D2 is placed on the primary PCI bus by the host at 822, and it appears on the output of PIREG1 and on the secondary bus one clock cycle later at 824 and 826, respectively, at time T10.

In the example of FIG. 8, at 828 the ASIC tells the FTR to pause by deasserting TRDY# on the secondary PCI bus, indicating that the ASIC is not yet ready to receive the next data word D2. By the time the deassertion of TRDY# is clocked through the FTR, appears on the primary PCI bus and is received at the host at 830, the host has already placed the next data word D4 on the primary bus at 832, and D3 was clocked into PIREG1 at 834. Because D2 has been clocked out of PIREG1 and replaced by D3 at 834, D2 would be lost if not for its presence on PIREG2 at 836. Thus, at time T10 the MUX2 is switched to take the output D2 from PIREG2, so that D2 is preserved on the secondary bus at 838.

When the pause is lifted by the ASIC by asserting TRDY# on the secondary PCI bus at 840, the FTR clocks TRDY# through to the primary PCI bus on the next clock edge at 842 to inform the host that the pause is lifted, and the next data word D3 is clocked into PIREG2 and placed on the secondary PCI bus at time T11.

In the example of FIG. 8, by this time the host has already deasserted FRAME# on the primary bus at 844, indicating the end of the host write transaction. The FRAME# deassertion causes TRDY# to be deasserted at 868, and the FRAME# deassertion is regenerated by the FTR on the secondary bus at 846. Note that the FRAME# deassertion at 844 also causes deasserted IRDY#, TRDY#, and DEVSEL# signals to be generated by the FTR at 848.

In many cases, PCI control signals do not flow-through the FTR but are regenerated during the start and end of transactions (e.g., DEVSEL#, FRAME#, IRDY#, and TRDY#), but flow-through the FTR once the transaction has been established (e.g. the temporary deassertion of TRDY# because the target buffer was full during a write transaction).

In the example of FIG. 8, a read transaction was attempted when the ASIC, via the FTR, asserted a dedicated REQ# line to the PCI bus arbiter on the primary PCI bus at 850. Note that the PCI bus arbiter did not immediately grant the primary PCI bus to the ASIC by asserting a dedicated GNT# line to the ASIC via the FTR, because the host was using the primary PCI bus for its write transaction, as described above. However, the deassertion of FRAME# at 846, indicating the end of the host write, frees up the primary PCI bus, and at that time the PCI bus arbiter grants the primary PCI bus to the ASIC by asserting GNT# to the ASIC at 852, which causes the delayed start of the ASIC read transaction. When GNT# is asserted at 852, indicating control over the primary PCI bus, the ASIC asserts FRAME# on the secondary PCI bus at 854 and places an address on the secondary PCI bus at 856. This address is clocked into SIREG1 at 858, and IRDY# is asserted by the ASIC at 860. DEVSEL#, generated by the FTR, is asserted at 862. The FTR regenerates an asserted FRAME# on the primary PCI bus at 864, and regenerates an asserted IRDY# on the primary PCI bus at 866, indicating that the ASIC is ready to receive data. At time T15 the address is also clocked onto the primary PCI bus at 870, and after one idle PCI clock period of decoding at 872, the host asserts TRDY# and DEVSEL# and places data on the primary PCI bus at 870. The FTR regenerates an asserted TRDY# at 872, and the data is clocked onto the secondary PCI bus at 874, where it is available for reading by the ASIC.

Figure 9:
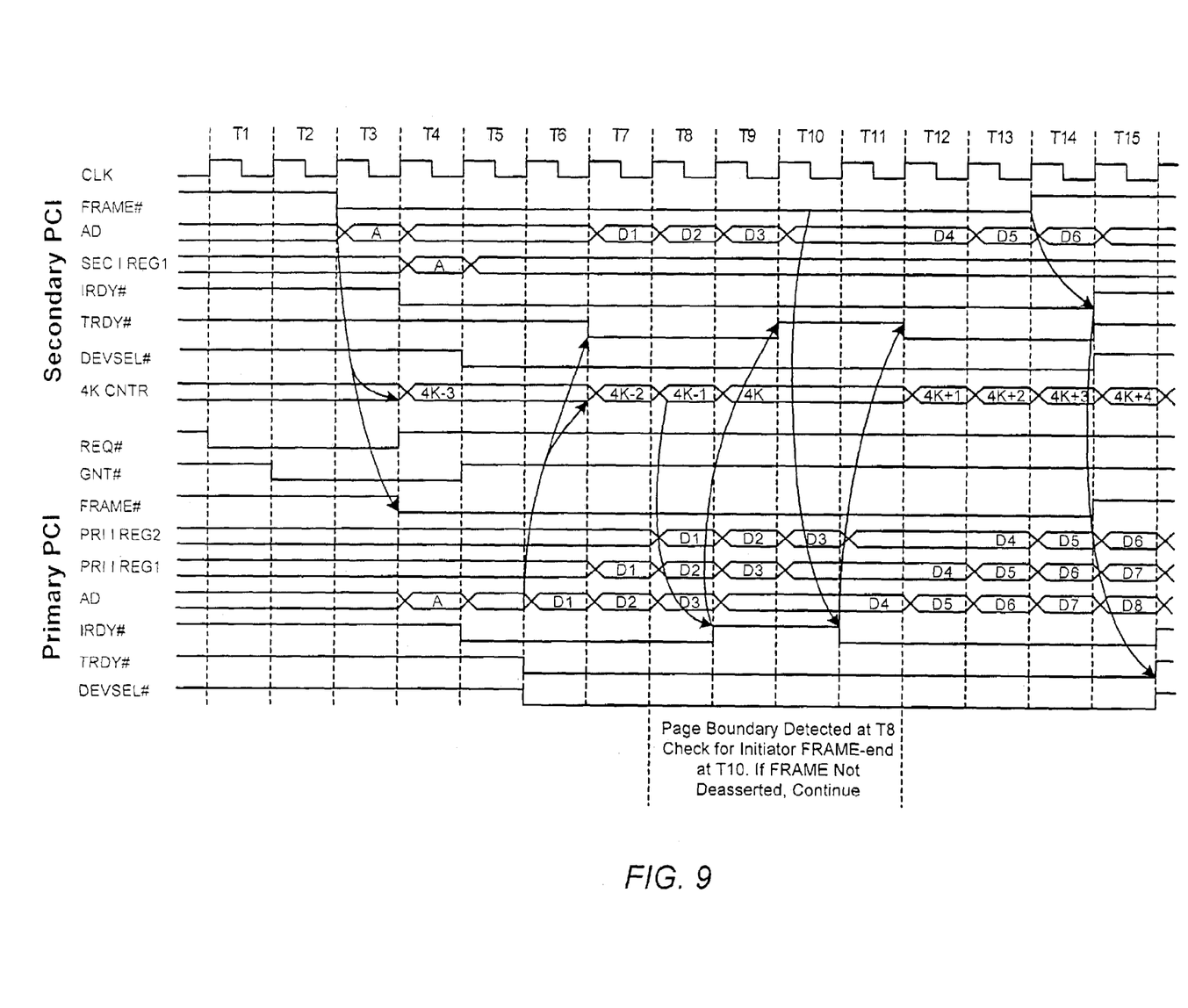
FIG. 9 is an exemplary timing diagram of a target-initiated read transaction with a page boundary crossing check followed by a continuation of the transaction according to embodiments of the present invention.
Figure 10:
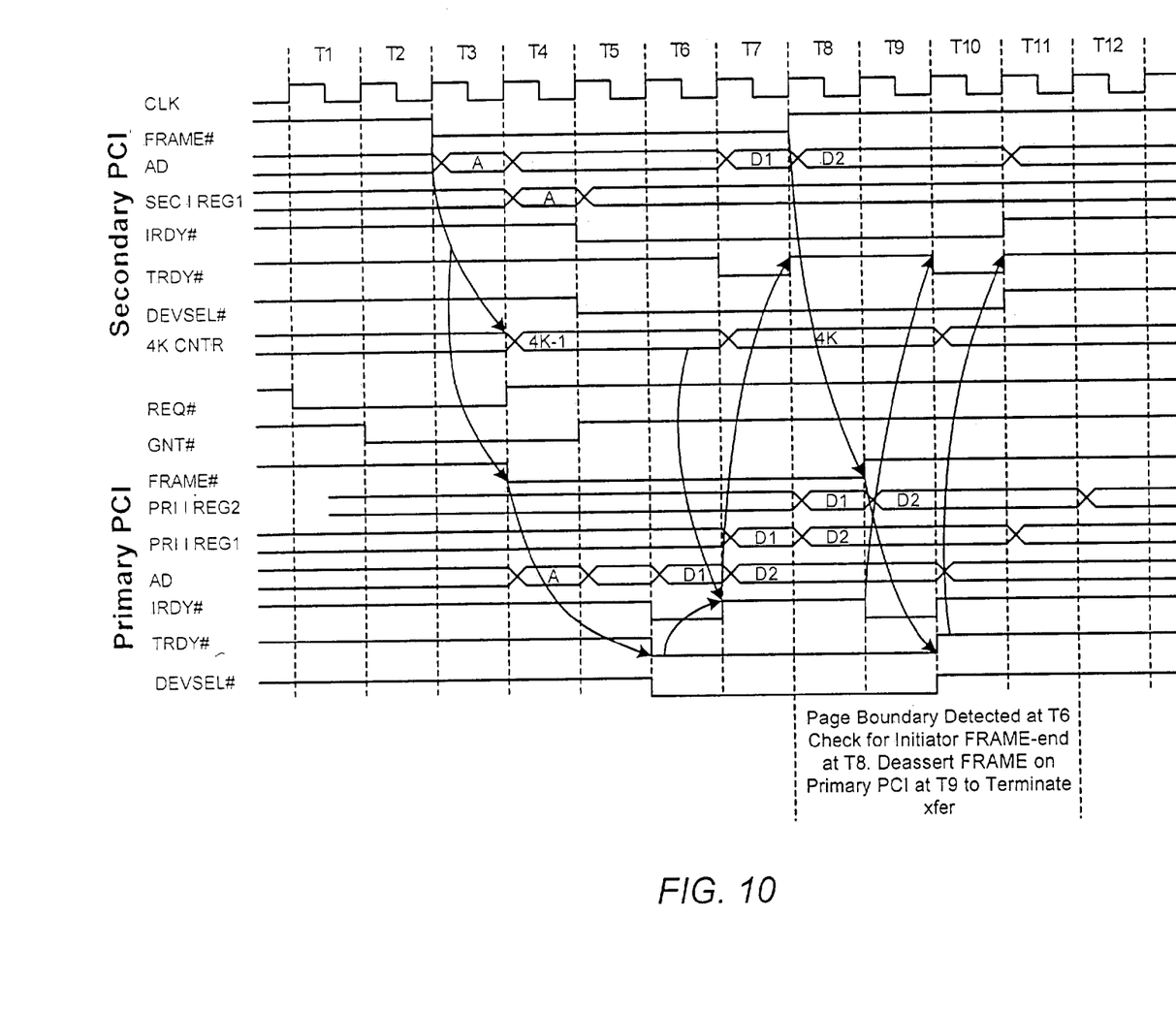
FIG. 10 is an exemplary timing diagram of a target-initiated read transaction with a page boundary crossing check followed by a termination of the transaction according to embodiments of the present invention.

FIG. 9 illustrates a timing diagram of an exemplary target-initiated read transaction with a page boundary crossing check followed by a continuation of the transaction in the example system of FIG. 5 according to an embodiment of the present invention. FIG. 10 illustrates a timing diagram of an exemplary target-initiated read transaction with a page boundary crossing check-followed by a termination of the transaction in the example system of FIG. 5 according to an embodiment of the present invention. In FIG. 10, the termination occurred because the last two words of the page were read.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An apparatus for providing a selectively transparent interface for transactions between one or more primary devices on a primary bus and a secondary device on a secondary bus, wherein one or more unique protocols are supported on the primary bus but not on the secondary bus, the apparatus comprising:

a first primary input register (PIREG1) for transferring transaction address, control and data information from the primary bus to the secondary bus with a delay of only one clock cycle;

a device select (DEVSEL) detector circuit coupled to PIREG1 for detecting if a transaction address received in PIREG1 is associated with one of the unique protocols; and a state machine coupled to PIREG1 and the DEVSEL detector circuit for performing operations to implement one of the unique protocols if the DEVSEL detector circuit determines that the transaction address received in PIREG1 is associated with one of the unique protocols.

2. The apparatus as recited in claim 1, wherein one of the unique protocols is Hot Swap, the apparatus further comprising:

a Hot Swap register (HSR) coupled to PIREG1 for enabling the apparatus to perform Hot Swap operations, the HSR containing an insertion bit and an extraction bit for indicating that the secondary device is being inserted into or extracted from the primary bus, respectively;

wherein the HSR is addressable and readable by a host device on the primary bus by placing a transaction address for the HSR into PIREG1 to enable the host device to determine if the apparatus is being inserted into or extracted from the primary bus; and wherein the HSR is addressable and writeable by the host device by placing a transaction address for the HSR into PIREG1 to reset the insertion and extraction bits after completion of the Hot Swap operations.

3. The apparatus as recited in claim 2, wherein the state machine is configured to determine whether a transaction is addressing the HSR by:

determining whether a command/byte enable (C/BE) field in PIREG1 indicates that the transaction is a configuration command;

determining whether an initialization device select (ID-SEL) bit in PIREG1 is asserted; and determining whether a specified number of least significant bits in the address in PIREG1 correspond to the address of the HSR.

4. An apparatus for providing a selectively transparent interface for transactions between one or more primary devices on a primary bus and a secondary device on a secondary bus, wherein one or more unique protocols are supported on the primary bus but not on the secondary bus, comprising:

a first primary input register (PIREG1) for transferring transaction address, control and data information from the primary bus to the secondary bus with a delay of one clock cycle;

a first secondary input register (SIREG1) for transferring transaction address, control and data information from the secondary bus to the primary bus with a delay of one clock cycle;

one or more shadow base address registers (BARs) for storing one or more addresses for the secondary device;

a device select (DEVSEL) detector circuit coupled to PIREG1 and the one or more shadow BARs for detecting if a transaction address received in PIREG1 is intended for the secondary device; and a state machine coupled to PIREG1 and the DEVSEL detector circuit for generating handshaking signals for the primary bus in accordance with the one or more unique protocols supported on the primary bus if the DEVSEL detector circuit determines that the transaction address received in PIREG1 is intended for the secondary device, and further coupled to SIREG1 for generating handshaking signals for the secondary bus in accordance with secondary bus protocols when a transaction address is received in SIREG1.

5. The apparatus as recited in claim 4, further comprising:

a second primary input register (PIREG2) coupled to PIREG1 for reclocking the transaction address, control and data information in PIREG1;

a second secondary input register (SIREG2) coupled to SIREG1 for reclocking the transaction address, control and data information in SIREG1;

a first multiplexer (MUX1) for coupling either PIREG1 or PIREG2 to the secondary bus; and a third multiplexer (MUX3) for coupling either SIREG1 or SIREG2 to the primary bus;

wherein the state machine uses the handshaking signals to pause a transaction when a target ready (TRDY#) handshaking signal is deasserted while the transaction is pending; and wherein the state machine controls MUX1 to select PIREG2 and controls MUX3 to select SIREG2 once the state machine detects from the handshaking signals that the paused transaction has resumed.

6. The apparatus as recited in claim 4, further comprising:

a boundary detect counter (CNTR) coupled to the state machine and having a terminal count equal to an integer fraction of a page of memory for counting accesses to memory during a target burst read transaction; and a boundary detect circuit coupled to CNTR and the state machine for indicating when CNTR reaches a value one less than its terminal count;

wherein the state machine uses the handshaking signals to pause the transaction when the boundary detect circuit indicates that CNTR has reached a value one less than its terminal count, and end the transaction if an end of the transaction is indicated by the handshaking signals or resume the transaction if no end of the transaction is indicated.

7. The apparatus as recited in claim 4, wherein the secondary bus is a PCI bus and the primary bus is a CompactPCI bus.

8. A host bus adapter (HBA) comprising the apparatus of claim 4 coupled to a fibre channel controller circuit through the secondary bus.

9. A server computer comprising the HBA of claim 8, wherein the primary bus is a CompactPCI bus, and further comprising a host CPU coupled to the CompactPCI bus.

10. A storage area network (SAN) comprising the server computer of claim 9, wherein a fibre channel network is coupled to the fibre channel controller circuit and one or more storage devices are coupled to the fibre channel network.

11. A host bus adapter (HBA) comprising the apparatus of claim 4 coupled to a storage network controller circuit through the secondary bus.

12. A server computer comprising the HBA of claim 11, wherein the primary bus is a CompactPCI bus, and further comprising a host CPU coupled to the CompactPCI bus.

13. A storage area network (SAN) comprising the server computer of claim 12, wherein a storage network is coupled to the storage network controller circuit and one or more storage devices are coupled to the storage network.

14. An apparatus for providing a selectively transparent interface for transactions between one or more primary devices on a primary bus and a secondary device on a secondary bus, wherein one or more unique protocols are supported on the primary bus but not on the secondary bus, the apparatus comprising:

a first primary input register (PIREG1) for transferring transaction address, control and data information from the primary bus to the secondary bus with a delay of only one clock cycle;

a first secondary input register (SIREG1) for transferring transaction address, control and data information from the secondary bus to the primary bus with a delay of only one clock cycle;

one or more shadow base address registers (BARs) for storing one or more addresses for the secondary device;

a device select (DEVSEL) detector circuit coupled to PIREG1 and the one or more shadow BARs for detecting if a transaction address received in PIREG1 is intended for the secondary device or is associated with one of the unique protocols; and a state machine coupled to PIREG1, SIREG1 and the DEVSEL detector circuit for generating handshaking signals for the primary bus in accordance with primary bus protocols if the DEVSEL detector circuit determines that the transaction address received in PIREG1 is intended for the secondary device, performing operations to implement one of the unique protocols if the DEVSEL detector circuit determines that the transaction address received in PIREG1 is associated with one of the unique protocols, and generating handshaking signals for the secondary bus in accordance with secondary bus protocols when a transaction address is received in SIREG1.

15. The apparatus as recited in claim 14, further comprising:

a second primary input register (PIREG2) coupled to PIREG1 for reclocking the transaction address, control and data information in PIREG1;

a second secondary input register (SIREG2) coupled to SIREG1 for reclocking the transaction address, control and data information in SIREG1;

a first multiplexer (MUX1) for coupling either PIREG1 or PIREG2 to the secondary bus; and a third multiplexer (MUX3) for coupling either SIREG1 or SIREG2 to the primary bus;

wherein the state machine uses the handshaking signals to pause a transaction when a target ready (TRDY#) handshaking signal is deasserted while the transaction is pending; and wherein the state machine controls MUX1 to select PIREG2 and controls MUX3 to select SIREG2 once the state machine detects from the handshaking signals that the paused transaction has resumed.

16. The apparatus as recited in claim 14, further comprising:
- a boundary detect counter (CNTR) coupled to the state machine and having a terminal count equal to an integer fraction of a page of memory for counting accesses to memory during a target burst read transaction; and
- a boundary detect circuit coupled to CNTR and the state machine for indicating when CNTR reaches a value one less than its terminal count;
- wherein the state machine uses the handshaking signals to pause the transaction when the boundary detect circuit indicates that CNTR has reached a value one less than its terminal count, and end the transaction if an end of the transaction is indicated by the handshaking signals or resume the transaction if no end of the transaction is indicated.

17. The apparatus as recited in claim 14, wherein one of the unique protocols is Hot Swap, the apparatus further comprising:
- a Hot Swap register (HSR) coupled to PIREG1 for enabling the apparatus to perform Hot Swap operations, the HSR containing an insertion bit and an extraction bit for indicating that the secondary device is being inserted into or extracted from the primary bus, respectively;
- wherein the HSR is addressable and readable by a host device on the primary bus by placing a transaction address for the HSR into PIREG1 to enable the host device to determine if the apparatus is being inserted into or extracted from the primary bus; and
- wherein the HSR is addressable and writeable by the host device by placing a transaction address for the HSR into PIREG1 to reset the insertion and extraction bits after completion of the Hot Swap operations.

18. The apparatus as recited in claim 17, wherein the state machine is configured to determine whether a transaction is for addressing the HSR by:
- determining whether a command/byte enable (C/BE) field in PIREG1 indicates that the transaction is a configuration command;
- determining whether an initialization device select (ID-SEL) bit in PIREG1 is asserted; and
- determining whether a specified number of least significant bits in the address in PIREG1 correspond to the address of the HSR.

19. The apparatus as recited in claim 14, wherein the secondary bus is a PCI bus and the primary bus is a CompactPCI bus.

20. A host bus adapter (HBA) comprising the apparatus of claim 14 coupled to a fibre channel controller circuit through the secondary bus.

21. A server computer comprising the HBA of claim 20, wherein the primary bus is a CompactPCI bus, and further comprising a host CPU coupled to the CompactPCI bus.

22. A storage area network (SAN) comprising the server computer of claim 21, wherein a fibre channel network is coupled to the fibre channel controller circuit and one or more storage devices are coupled to the fibre channel network.

23. A host bus adapter (HBA) comprising the apparatus of claim 14 coupled to a storage network controller circuit through the secondary bus.

24. A server computer comprising the HBA of claim 23, wherein the primary bus is a CompactPCI bus, and further comprising a host CPU coupled to the CompactPCI bus.

25. A storage area network (SAN) comprising the server computer of claim 24, wherein a storage network is coupled to the storage network controller circuit and one or more storage devices are coupled to the storage network.

26. A method for providing a selectively transparent interface for transactions between one or more primary devices on a primary bus and a secondary device on a secondary bus, wherein one or more unique protocols are supported on the primary bus but not on the secondary bus, the method comprising:
- clocking transaction address, control and data information from the primary bus to the secondary bus with a delay of only one clock cycle;
- detecting if a transaction address clocked through to the secondary bus is associated with one of the unique protocols; and
- performing operations to implement one of the unique protocols if the transaction address clocked through to the secondary bus is associated with one of the unique protocols.

27. The method as recited in claim 26, wherein one of the unique protocols is Hot Swap, the method further comprising:
- if the transaction address clocked through to the secondary bus is associated with Hot Swap,
  - addressing and reading an insertion bit and an extraction bit in a Hot Swap register (HSR) from a host device on the primary bus to enable the host device to determine if the secondary device is being coupled to or decoupled from the primary bus,
  - performing Hot Swap operations according to whether the secondary device is being coupled to or decoupled from the primary bus, and
  - resetting the insertion bit and the extraction bit in the HSR after completion of the Hot Swap operations.

28. The method as recited in claim 27, further comprising determining whether the transaction address clocked through to the secondary bus is associated with Hot Swap by:
- determining whether a command/byte enable (C/BE) field in the transaction address indicates that the transaction is a configuration command;
- determining whether an initialization device select (ID-SEL) bit in the transaction address is asserted; and
- determining whether a specified number of least significant bits in the transaction address corresponds to an address of the HSR.

29. A method for providing a selectively transparent interface for transactions between one or more primary devices on a primary bus and a secondary device on a secondary bus, wherein one or more unique protocols are supported on the primary bus but not on the secondary bus, comprising:
- clocking forward transaction address, control and data information from the primary bus to the secondary bus with a delay of only one clock cycle;
- clocking reverse transaction address, control and data information from the secondary bus to the primary bus with a delay of only one clock cycle;
- storing one or more addresses for the secondary device;
- detecting if a forward transaction address is intended for the secondary device by comparing the forward transaction address to the stored addresses for the secondary device; and
- generating handshaking signals for the primary bus in accordance with the one or more unique protocols supported on the primary bus if the forward transaction address is intended for the secondary device, and generating handshaking signals for the secondary bus in accordance with secondary bus protocols when a reverse transaction address is clocked from the secondary bus to the primary bus.

30. The method as recited in claim 29, further comprising:
reclocking the forward transaction address, control and data information clocked from the primary bus to the secondary bus;
reclocking the reverse transaction address, control and data information clocked from the secondary bus to the primary bus;
selectively coupling either the clocked or the reclocked forward transaction address, control and data information to the secondary bus; and
selectively coupling either the clocked or the reclocked reverse transaction address, control and data information to the primary bus;
using the handshaking signals to pause a transaction when a target ready (TRDY#) handshaking signal is deasserted while the transaction is pending; and
coupling the reclocked forward transaction address, control and data information to the secondary bus and coupling the reclocked reverse transaction address, control and data information to the primary bus once the paused transaction has resumed.

31. The method as recited in claim 29, further comprising:
counting accesses to memory during a target burst read transaction up to a terminal count equal to an integer fraction of a page of memory; and
detecting when the number of accesses to memory has reached a value one less than the terminal count;
using the handshaking signals to pause the transaction when the number of accesses to memory has reached a value one less than the terminal count, and ending the transaction if an end of the transaction is indicated by the handshaking signals or resuming the transaction if no end of the transaction is indicated.

32. The method as recited in claim 29, wherein the secondary bus is a PCI bus and the primary bus is a CompactPCI bus.

33. A method for providing a selectively transparent interface for transactions between one or more primary devices on a primary bus and a secondary device on a secondary bus, wherein one or more unique protocols are supported on the primary bus but not on the secondary bus, the method comprising:
clocking forward transaction address, control and data information from the primary bus to the secondary bus with a delay of only one clock cycle;
clocking reverse transaction address, control and data information from the secondary bus to the primary bus with a delay of only one clock cycle;
storing one or more addresses for the secondary device;
detecting if a transaction address clocked through to the secondary bus is associated with one of the unique protocols; and
performing operations to implement one of the unique protocols if the forward transaction address clocked through to the secondary bus is associated with one of the unique protocols, generating handshaking signals for the primary bus in accordance with primary bus protocols if the forward transaction address is intended for the secondary device, and generating handshaking signals for the secondary bus in accordance with secondary bus protocols when a reverse transaction address is clocked from the secondary bus to the primary bus.

34. The method as recited in claim 33, further comprising:
reclocking the forward transaction address, control and data information clocked from the primary bus to the secondary bus;
reclocking the reverse transaction address, control and data information clocked from the secondary bus to the primary bus;
selectively coupling either the clocked or the reclocked forward transaction address, control and data information to the secondary bus; and
selectively coupling either the clocked or the reclocked reverse transaction address, control and data information to the primary bus;
using the handshaking signals to pause a transaction when a target ready (TRDY#) handshaking signal is deasserted while the transaction is pending; and
coupling the reclocked forward transaction address, control and data information to the secondary bus and coupling the reclocked reverse transaction address, control and data information to the primary bus once the paused transaction has resumed.

35. The method as recited in claim 33, further comprising:
counting accesses to memory during a target burst read transaction up to a terminal count equal to an integer fraction of a page of memory;
detecting when the number of accesses to memory has reached a value one less than the terminal count; and
using the handshaking signals to pause the transaction when the number of accesses to memory has reached a value one less than the terminal count, and ending the transaction if an end of the transaction is indicated by the handshaking signals or resuming the transaction if no end of the transaction is indicated.

36. The method as recited in claim 33, wherein one of the unique protocols is Hot Swap, the method further comprising:
if the transaction address clocked through to the secondary bus is associated with Hot Swap,
addressing and reading an insertion bit and an extraction bit in a Hot Swap register (HSR) from a host device on the primary bus to enable the host device to determine if the secondary device is being coupled to or decoupled from the primary bus,
performing Hot Swap operations according to whether the secondary device is being coupled to or decoupled from the primary bus, and
resetting the insertion bit and the extraction bit in the HSR after completion of the Hot Swap operations.

37. The method as recited in claim 36, further comprising determining whether a transaction is for addressing the HSR by:
determining whether a command/byte enable (C/BE) field in the transaction address indicates that the transaction is a configuration command;
determining whether an initialization device select (ID-SEL) bit in the transaction address is asserted; and
determining whether a specified number of least significant bits in the transaction address corresponds to the address of the HSR.

38. The method as recited in claim 33, wherein the secondary bus is a PCI bus and the primary bus is a CompactPCI bus.

39. An apparatus for providing a selectively transparent interface for transactions between one or more primary devices on a primary bus and a secondary device on a secondary bus, wherein one or more unique protocols are supported on the primary bus but not on the secondary bus, comprising:
- a first primary input means for transferring transaction address, control and data information from the primary bus to the secondary bus with a delay of one clock cycle;
- a first secondary input means for transferring transaction address, control and data information from the secondary bus to the primary bus with a delay of one clock cycle;
- one or more shadow base address registers (BARs) for storing one or more addresses for the secondary device;
- a device select (DEVSEL) detector means coupled to the first primary input means and the one or more shadow BARs for detecting if a transaction address received in the first primary input means is intended for the secondary device; and
- a state machine means coupled to the first primary input means and the DEVSEL detector means for generating handshaking signals for the primary bus in accordance with the one or more unique protocols supported on the primary bus if the DEVSEL detector means determines that the transaction address received in the first primary input means is intended for the secondary device, and further coupled to the first secondary input means for generating handshaking signals for the secondary bus in accordance with secondary bus protocols when a transaction address is received in the first secondary input means.

* * * * *